COPY EDITOR PROCESSING DEVICE

Filed Oct. 22, 1963 9 Sheets-Sheet 1

INVENTORS.
ROBERT L. SORENSEN &
HERMAN D. PARKS
BY Brumbaugh, Free, Graves & Donohue
their ATTORNEYS INVENTORS.
ROBERT L. SORENSEN &
HERMAN D. PARKS
BY Brumbaugh, Free, Graves & Donohue
their ATTORNEYS

FIG.3A

The Nation (Smith)

1) Technology

2) Here Come The Robots

The purpose of these samples is to illustrate the various forms that copy will take in the new Copy Processing System, and to demonstrate the use of the system of instruction codes that typists will use to provide the Copy Processor with the information it needs.

Whenever a typist gets a piece of copy to retype, with the exception of writer's copy it will have a first line called the Instruction Line. The first group of seven symbols called the Index Group consist of a first letter which identifies a Time Incorporated operation (for example T for TIME), a second letter which identifies a department of that operation (example: A for The Nation), two digits to identify the particular story, followed by three digits which will be the Index Number of the version of the story as stored in the computer's memory. Only the three digits of the Index Number are changed as the story goes through sucessive editorial refinements.

INVENTORS.
ROBERT L. SORENSEN &
HERMAN D. PARKS
BY Brumbaugh, Free, Graves & Donohue
their ATTORNEYS.

FIG. 3B

TA00 000 AA BA CA

The Nation (Smith) Fri 7/14 abc

DATECHNOLOGY

DBHere Come The Robots

EAThe purpose of these samples is to illustrate the various forms that copy will take in the new Copy Processing System, and to demonstrate the use of the system of instruction codes that typists will use to provide the Copy Processor with the information it needs. EAWhenever a typist gets a piece of copy to retype, with the exception of writer's copy it will have a first line called the Instruction Line. The first group of seven symbols called the Index Group consist of a first letter which identifies a Time Incorporated operation (for example T for TIME), a second letter which identifies a department of that operation (example: A for The Nation), two digits to identify the particular story, followed by three digits which will be the Index Number of the version of the story as stored in the computer's memory. Only the three digits of the Index Number are changed as the story goes through successive editorial refinements. EB INVENTORS.
ROBERT L. SORENSEN &
HERMAN D. PARKS
BY Brumbaugh, Free, Graves & Donohue
their ATTORNEYS.

FIG.3C

TA04 306 AA BA CA

001 The Nation (Smith) Fri 7/14 abc

003 DATECHNOLOGY

005 DB~~Here Come The Robots~~

007 The purpose of these samples is to illustrate the various forms that copy will 009 take in the new Copy Processing System, and to demonstrate the use of the 011 system of instruction codes that typists will use to provide the Copy Processor 013 with the information it needs.

015 Whenever a typist gets a piece of copy to retype, with the exception of writer's 017 copy, it ~~will have a first line~~ called the Instruction Line. The first group of 019 seven symbols called the Index Group consist of a first letter which identifies 021 a Time Inc~~orporated~~ operation (for example T for TIME), a second letter which 023 identifies a department of that operation (example: A for The Nation), two digits 025 to identify the particular story, ~~followed by~~ three digits which will be the 027 Index Number of the version of the story as stored in the computer's memory.

029 Only the three digits of the Index Number are changed as the story goes through 031 sucessive editorial refinements 024

INVENTORS.
ROBERT L. SORENSEN &
HERMAN D. PARKS
BY Brumbaugh, Free, Graves & Donohue
their ATTORNEYS.

FIG. 3D

TA04 306 AA BA CA

The Nation (Smith) Fri 7/14 def

003

DBNew Approach

DBTo Copy Processing

FA 007008 take in the new FBCopy Processing System, FA010011 will use to provide the FBCopy Processor FA013016copy, its first line will be called the 018 seven symbols of this line, called the Index Group, will 020 a TFDime FAIFDne. FAoperation (for example T for TFDime), FAa second letter which 023024 to identify the particular story, and finally three digits which will be the Index Number of the version of the story 028 As the story goes through successive editorial refinements, only the last three digits of the Index Number are changed. EB

FIG. 3F

TA04 363 AA BA CB

The Nation (Smith) Sat 7/15 ghi

003

005

009011 012 system of instruction code letters that typists will use to provide the Copy Processor with the information it needs. 017018 copy, its first line will be called the 020027 the particular story and finally the last three

029033 EB

INVENTORS.
ROBERT L. SORENSEN &
HERMAN D. PARKS
BY Brumbaugh, Free, Graves + Donohue
their ATTORNEYS.

FIG.3E

PRINTER'S COPY

TA04 363 AA BA ~~CA~~ CB

001 The Nation (Smith) Fri 7/14 def

003 DATECHNOLOGY

005 DBNew Approach

007 ~~DBT: Copy Processing~~

009 The purpose of these samples is to illustrate the various forms that copy will 011 take in the new FBCopy Processing System, FA and to demonstrate the use of the 013 system of instruction code~~s~~ letters that typists will use to provide the ~~F~~BCopy Processor 015 ~~FA~~ with the information it needs.

017 Whenever a typist gets a piece of copy to retype, with the exception of writer's 019 copy, its first line will be called the Instruction Line. The first group of 021 seven symbols of this line, called the Index Group, will consist of a first 023 letter which identifies a TFDime FAIFD nc. FAoperation (for example T for TFDime), 025 FAa second letter which identifies a department of that operation (example: A 027 for The Nation), two digits to identify the particular story, and finally the last three 029 digits which will be the Index Number of the version of the story as stored in 031 the computer's memory. As the story goes through successive editorial refinements, 033 only the last three digits of the Index Number are changed. 025

INVENTORS.
ROBERT L. SORENSEN &
HERMAN D. PARKS
BY Brumbaugh, Free, Graves & Donohue
their ATTORNEYS.

FIG.3G

TA04 407 AA BA CB

001 The Nation (Smith) Sat 7/15 ghi

002 DATECHNOLOGY

003 DBNew Approach

004 The purpose of these samples is to
005 illustrate the various forms that copy
006 will take in the new FBCopy Processing
007 System, FAand to demonstrate the use of
008 the system of instruction code letters
009 that typists will use to provide the Copy
010 Processor with the information it needs. (-1)
011 Whenever a typist gets a piece of copy
012 to retype, with the exception of the wri-
013 ter's copy, its first line will be call-
014 ed the Instruction Line. The first group
015 of seven symbols of this line, called
016 the Index Group, will consist of a first
017 letter which identifies a TFDime FAIFDnc.
018 FAoperation (for example T for TFDime) FAa
019 second letter which identifies a depart-
020 ment of that operation (example: A for
021 The Nation), two digits to identify the C. + S.C.
022 particular story and finally the last
023 three digits which will be the Index Num-
024 ber of the version of the story as stored
025 in the computer's memory. As the story each
026 goes through successive editorial refine-
027 ments, only the last three digits ~~of the~~
028 ~~Index Number~~ are changed. 025

FIG.3H

TA04 407 AA BA CB

001

002

003

004020 TFDhe FANFDationFA), two digits to identify the 022025 goes through each editorial refinement, only the last three digits are changed. EB INVENTORS.
ROBERT L. SORENSEN &
HERMAN D. PARKS
BY Brumbaugh, Free, Graves & Donohue
their ATTORNEYS.

FIG. 3I

TA04 482 AA BA ~~CK~~ CC

001 The Nation (Smith) Sat 7/15 ghi

002 DATECHNOLOGY

003 DBNew Approach

004 The purpose of these samples is to
005 illustrate the various forms that copy
006 will take in the new FBCopy Processing
007 System, FAand to demonstrate the use of
008 the system of instruction code letters
009 that typists will use to provide the Copy
010 Processor with the information it needs.
011 Whenever a typist gets a piece of copy
012 to retype, with the exception of the wri-
013 ter's copy, its first line will be call-
014 ed the Instruction Line. The first group
015 of seven symbols of this line, called
016 the Index Group, will consist of a first
017 letter which identifies a TFDime FAIFDne.
018 FAoperation (for example T for TFDime) FAa
019 second letter which identifies a depart-
020 ment of that operation (example: A for
021 TFDhe FANFDationFA), two digits to identify
022 the particular story and finally the last
023 three digits which will be the Index Num-
024 ber of the version of the story as stored
025 in the computer's memory. As the story
026 goes through each editorial refinement,
027 only the last three digits are changed. 024

TAPE galley 9

FIG. 3J

TA04 482 AA BA CC
Galley 9
002
003
004027 EB

INVENTORS.
ROBERT L. SORENSEN &
HERMAN D. PARKS
BY Brumbaugh, Free, Graves & Donohue
their ATTORNEYS.

United States Patent Office 3,328,764

Patented June 27, 1967

3,328,764
COPY EDITOR PROCESSING DEVICE

Robert Louis Sorensen, Westport, and Herman D. Parks, Norwalk, Conn., assignors to Time, Incorporated, New York, N.Y., a corporation of New York Filed Oct. 22, 1963, Ser. No. 317,915
13 Claims. (Cl. 340—172.5)

This invention relates to a method for processing editorial matter (copy) through one or more transcription cycles beginning with, say, a writer's manuscript as an initial input and terminating as the final output with a record (printed and/or coded on a medium) incorporating all editorial changes made between successive transcription cycles.

In the conventional mode of preparing copy for, say, the composition of magazines or books, copy is retyped several times. The first typing converts the writer's manuscript into clean typescript of a specified format. Thereafter a second typing takes place after editing. The retyped copy may again be edited or checked for grammatical or factual content and if satisfactory, be again keyboarded, this time on teletypesetter (TTS) machines which produce both hardcopy and tape. Finally, after the hardcopy has been proofread and altered for fit, a new tape is made by using the old tape to control the punching of unchanged portions of the copy, and by having the operator intervene to keyboard in changed portions. The final tape may then be used to transmit the copy as a teletype message to a remote printing plant or to drive a tape operated phototypesetter.

Objects of the present invention are to reduce the amount of labor and the degree of skill required in the conventional transcription process and to reduce the time conventionally required for transcribing a given piece of copy, particularly in the more advanced stages of editorial refinement. A further object of the present invention is to reduce the generation of new typographical errors due to re-keyboarding of sound copy.

These and other objects are realized according to the invention by a method in which a unit of copy (a news story, a book chapter, or any part thereof which is to be processed as a unit) is progressively perfected for composing purposes by being revised or otherwise worked upon in an iterative manner in each of a succession of copy processing cycles. A copy processing cycle is defined herein as the operations, which begin with the keyboarding of an input unit of copy and which end with the making by an output device of a record of the unit of copy as processed in that cycle. As explained in detail hereinafter, such output record may be, for example, a printed output copy (produced by, say, an output typewriter or printing machine) or it may be output copy in the form of a coded record such as that provided by a punched tape. In every copy processing cycle except the last the output copy is or may be subjected to editorial revision.

In accordance with the invention, the mentioned succession of copy processing cycles have a closed loop relation with each other in that, for any cycle except for the last, the editorially revised output copy from a given cycle is the material which is keyboarded in an abbreviated version to provide the input copy for the next cycle. In each of such cycles, the processed copy not only is provided as an output but, in addition, is electronically stored in coded form. The use made of such storing of information is that, in every cycle except the first, the copy stored during the previous cycle is automatically called out to supply for the new cycle those lines of copy material which are "saved," i.e., not been changed by editing between the end of the previous cycle and the beginning of the new cycle. Because all of the saved lines are so supplied from storage, the typist at the beginning of any new cycle (except the first) is called upon to keyboard for input purposes only those lines of text material which have been editorially revised before that beginning but since the end of the previous cycle. Thus, as compared to the described conventional method of preparing copy wherein all the lines of copy must be keyboarded in every keyboarding, the method according to the present invention substantially reduces the labor involved and skill required in keyboarding successive versions of a unit of copy, and, moreover, reduces commensurately the probability of generating new keyboarding errors in the course of successive keyboardings.

For a better understanding of the invention, reference is made to the following description of a representative method of practice of the invention and to the accompanying drawings wherein:

FIGS. 3A to 3J are representative of the form assumed by such exemplary unit of copy at various stages of progress represented in the FIG. 2 diagram.

*General description*

Figure 1:
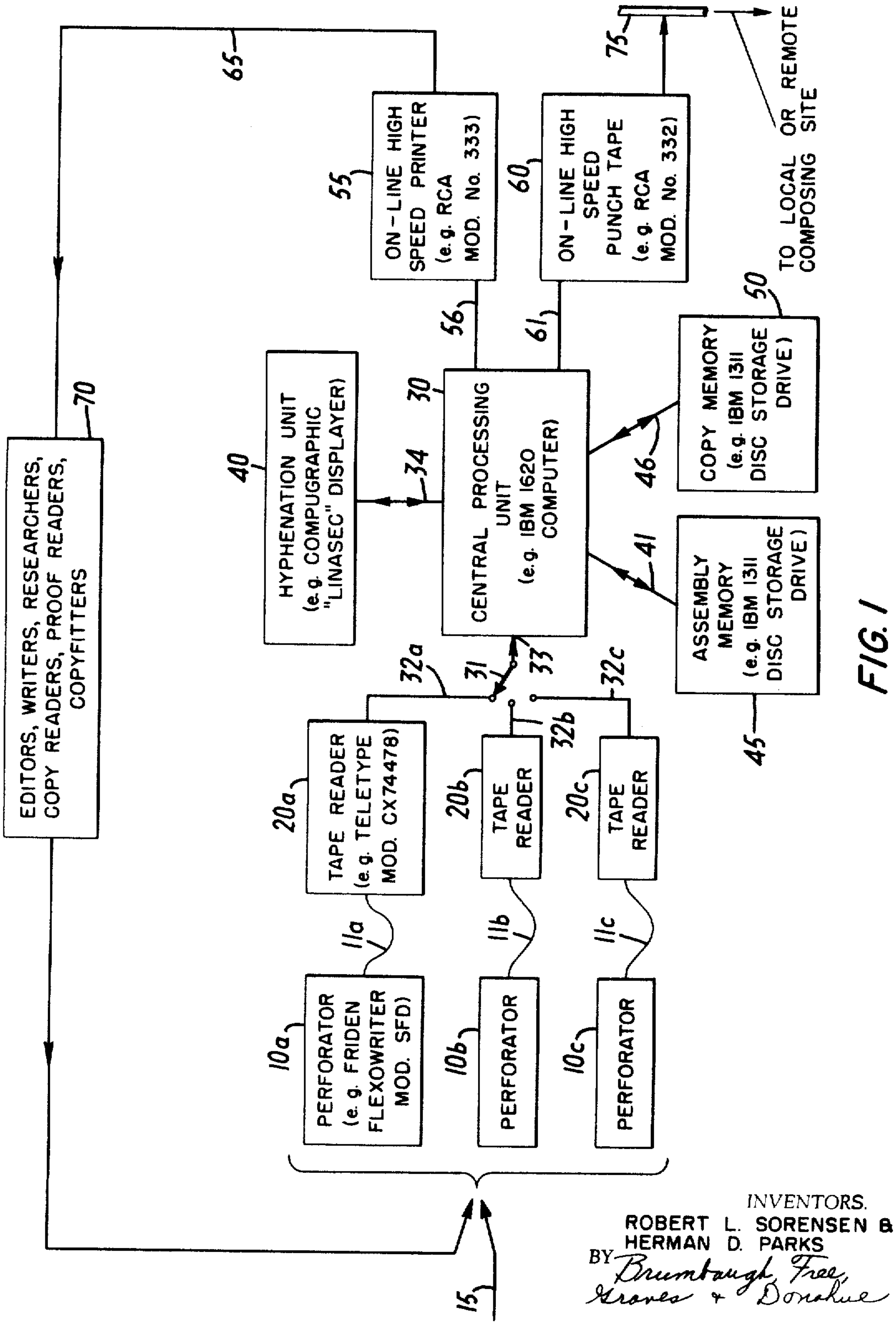
FIG. 1 is a schematic block diagram of a system for carrying out the method.

Referring now to FIG. 1, the reference numerals 10*a*, 10*b* and 10*c* designate three similar input machines to which more can be added up to say, a total number of twenty. Since all the machines are all essentially the same, only the machine 10*a* will be described in detail.

The machine 10*a* has a standard typewriter keyboard adapted when operated by a typist both to provide on a roll or fan fold paper supply a type script (typist copy) of the keyboard material and to punch into an output tape 11*a* a string of codings representing such material. The keyboard has ribbon shift capability so that by operating a special "instruction" key the typist may type in red ribbon on the type script and simultaneously "flag" codings on the tape as being red-ribbon codings. Moreover, the machine has a special key for "killing" any wholly or partially typed line of characters. The machine 10*a* is, for example, a model SFD "Flexowriter" tape perforator manufactured by the Friden Company.

A copy processing by the FIG. 1 system is initiated by supplying to the typist of, say, the perforator 10*a* a writer's manuscript or other unit of raw copy. As indicated by arrow 15, such initial copy comes from outside the system, i.e., has an origin which is not within the system itself.

The manuscript is entered as an input to the system by keyboarding it on the mentioned perforator 10*a*. A typescript record of the keyboarding is made on the platen of the machine in the conventional manner, but that record has no purpose in the system beyond providing the typist with a visual record of her keyboarding. The useful output of input typing is the string or sequence of coding punched in the tape 11*a* as a result of the keyboarding operations.

During the typing of the new copy, the typist includes before, during, and after the normal copy text a variety of instruction codes which indicate, for example, the type faces, line measures and the kind and format of the output copy to be produced by the system at the end of the first cycle. Those instruction codes are typed as regular alphanumeric characters, but are signified as instruction codes by the typist depressing the "instruction" key during their keyboarding. As mentioned, the effect of depressing the "instruction" key is (1) to cause the instruction code characters to appear in red on the typist's copy, and (2) to "flag" the corresponding punch codings on tape 11a as being red ribbon or "instruction" codings. One of such instruction codes is an "index group" which is typed out in red ribbon in a separate line ahead of the rest of the copy to form a heading therefor. As originally typed the coding of such "Index" group provides certain information on the category of the particular unit of copy being keyboarded, but it does not provide any index number.

In the typing of the text of the copy, the typist keyboards the copy without numbering the lines on the left-hand margin and without regard to line length. That is, within the body of the copy, the typist may initiate a carriage return at any time without affecting the lineation of the output copy, that lineation being automatically determined (as later explained) by the operation of the FIG. 1 system. Thus, there is no burden on the typist to keyboard in justified or justifiable lines. If an error is made during the keyboarding, that error can be removed from the punched codings on tape 11a by the depressing of the special key which "kills" (renders ineffectual) on the tape the codings corresponding to the entire line of characters in which the error is made.

The tape 11a extends from the perforator 10a to a tape reader 20a which converts the punched codings on the tape into binary coded electrical signals. That reader 20a may be, for example, a Model CX74478 tape reader manufactured by the Teletype Corporation. Between the machines 10a and 20a, the tape 11a has a slack loop on which accumulate codings punched on the tape by perforator 10a and corresponding to one or more units of copy. The reader 20a takes up (feeds into itself) the tape 11a to read the codings stored in its loop only when the reader 20a is given a command to read. The other shown tape readers 20b and 20c are similar to 20a and operate in like manner to read punched codings accumulated in the loops of, respectively, the tapes 11b and 11c as a result of the punching of those last-named tapes by, respectively, the perforators 10b and 10c.

The readers 20a, 20b and 20c are placed "on line" one at a time to transmit a unit or units of copy to a central processing unit 30. That is, only one at a time of the readers is operated to convert a punch coded unit of copy on its associated tape into a string or sequence of binary coded electrical signals and to supply that string of coded electrical signals to the input 33 of the copy processor 30.

In FIG. 1, the selection of which of the tape readers is to so operate at a given time is shown as being accomplished by a switch 31 which may be thrown manually to any one of three positions corresponding to the three tape readers. One effect of throwing the switch to a selected one of such positions is to initiate the reading, converting, and transmitting operations of the associated reader. Another effect is to establish a signal transfer connection from the output of that reader to the input of the copy processor 30. The individual connections for the three readers are schematically represented in FIG. 1 as being commonly through the switch 31 and separately through cables 32a, 32b and 32c for, respectively, the readers 20a, 20b and 20c. In practice, the functions described herein as being performed by switch 31 may be performed by an alloter device which automatically puts "on line" in sequence those among the tape readers whose tapes have accumulated a punch coded unit of copy which is ready to be transmitted to the copy processing unit.

The unit 30 is a digital electronic data processing computer as, for example, a model 1620 computer manufactured by International Business Machines Corporation, an RCA 301 computer or a model PDP–1 computer manufactured by the Digital Equipment Corporation. Such a computer operates in accordance with the stored program principle. That is, as opposed to a computer or other electrical system whose mode of operation is wholly or predominantly determined by the layout of its circuitry, the computer 30 has a circuitry which is unspecialized in the sense that the structural layout thereof does not in itself restrict the operation of the computer to one particular mode. Instead, the computer 30 is capable of performing any one of an almost infinite number of combinations of operations, and which particular combination of operations the computer does perform is determined by the entering beforehand into the computer of a series of electrical signals which are electronically stored to thereafter provide a selected program of action for the computer. Although the storing of such a program makes no structural changes in the circuitry of the computer, a program which has so been stored does have the effect of subsequently controlling and directing the flow of signals in the circuitry so as to cause the operations of the computer to accord with those called for by the program.

In the present instance, computer 30 has stored therein a program which directs the computer to perform certain operations on the strings of binary coded electrical signals which represent keyboarded units of copy, and which are received in turn at the input 33 of the computer. Those computer operations can best be described in terms of their result on the output copy provided from the computer, and, during the first cycle of the FIG. 1 system, they are as follows:

(1) The revising of the "index group" of the unit of copy being processed to include an "index number" which serves in the next cycle to distinguish that particular unit of copy from all other units of copy.

(2) The breaking up of the input copy text of random line length into justifiable lines based on the line measure and type faces as identified by the instruction codes included in the input copy.

(3) The assigning of line numbers to all lines of the lineated copy except for the heading line which contains the "index group" and is an unnumbered line or the "zero" line.

(4) The storing electronically of the newly processed copy (as broken into lines) together with the assigned index number, the assigned line numbers and the instruction codes keyboarded along with the text of the copy.

(5) The converting of the coding of the newly processed copy into whatever form is required to print or punch out the copy including the addition and deletions of codes in order to determine the proper output format.

(6) The controlling of the print-out or punch-out of the newly processed copy.

To consider the above-listed operations in more detail, during the first and other early copy processing cycles, the breaking of the unit of copy into justifiable lines (operation 2) is carried out by a mode which is termed herein "approximate justification," and which is put into effect by an instruction code keyboarded by the typist. In this mode, whenever the computer determines that a word would have to be split by an end-of-line hyphen in order to provide a justifiable line, the computer instead determines which word space bounding that word is closest to the last character which could be packed into that line and still permit justification, and the computer then breaks the line at that space. Further, the computer calculates the error in line length as if the tight point (i.e., the selected break point) were a valid break point, and the computer then adds or subtracts that error from the basic line measure to which the next line is to be set. The choice of addition or subtraction of the error will depend on whether the first line was underset or overset. The advantage of "approximate justification" is that it avoids the hyphenation problem (by breaking all lines at word spaces) and thereby can be carried out wholly automatically because no human operator is needed to provide "value judgments" of the places where a word can be hyphenated with grammatical propriety.

During the later cycles of copy processing, the computer 30 is signaled by an instruction code keyboarded by the operator to switch over from "approximate justification" to "exact justification." Both modes of justification compute line break points in the same manner when lines can be broken without hyphenation. Specifically, for both modes of justification, the procedure is that, within the justification range of the line as determined by the number of word spaces in that line and the permissible range width of those spaces, the computer will seek the tightest line that can be set ending with a complete word. It is only when a word must be broken to enable a line to be fitted within the justification range that the two modes differ.

Assuming that a word must so be broken, when the exact justification mode has been called for, the computer 30 transmits the electric coding for that word through a data transfer connection 34 to a hyphenation display unit 40 which may be, for example, the "Linasec" display device manufactured by the Compugraphic Corporation of Brookline, Mass. Such a device comprises a cathode ray tube of which the screen displays in block letters the word to be hyphenated and, in addition, tight and loose line indices bracketing those letters between any two of which the operator may select a break point. Underneath the screen display is a set of push buttons of which each corresponds to one of the interletter positions of the word being displayed. A human operator observes the display and then pushes that one of the buttons which is associated with the interletter position at which the displayed word can be most appropriately split by an end-of-line hyphen. The pushing of the selected button generates coding which is transmitted back through connection 34 to computer 30 to signal to the computer the interletter position chosen for hyphenation.

Turning now to the matter of storage (operation 4), after the computer 30 has effected operations 1, 2, and 3, the operated-on string of codings is electronically stored by being transmitted through a data transfer connection 41 to an assembly memory device 45 which may be, for example, an IBM disc storage drive (model #1311) or an RCA model #381 tape drive or an RCA data disc file (model #366). The device 45 is utilized to provide storage only while the computer 30 is processing, subsequent storage being provided by a copy memory 50.

More specifically, the computer 30 is so programmed that, after the processing of any given unit of copy has been completed (as indicated by an "end" instruction code keyboarded on the input copy by the typist), the whole string of codings corresponding to that copy is called out from storage device 45, transmitted through connection 41 back to computer 30 and then re-transmitted from the computer through a data transfer connection 46 to the copy memory storage device 50 providing a new storage place for the string. By virtue of this transfer of information from device 45 to device 50, the device 45 is cleared after each processing of a unit of copy.

The device 50 provides a quasi-permanent storage for each unit of copy which has been processed and for each of the several versions which are created for a given unit of copy as a result of processing it through several cycles of the FIG. 1 system. Within the copy memory device 50, the storage of a unit of copy (or of a version thereof) is line for line storage in the sense that the entire string of coding stored as a unit of copy is comprised of substrings of coding of which each corresponds to one numbered line of the body of the processed unit of copy (or version thereof), and of which each can be called out from the copy memory independently of the others. It might be noted that the index number assigned to the copy and the line numbers assigned to the justifiable lines of the processed copy define addresses of storage of the substrings rather than being entered into the memory device as stored signals.

As indicated by FIG. 1, the copy memory 50 may, structurally speaking, be alike to the assembly memory 45. Thus, the copy memory may also be provided, for example, by an IBM disc storage drive (model #1311), an RCA model #381 tape drive or an RCA data disc file (model #366). Functionally speaking, the two memory devices differ because the assembly memory 45 is, as described, utilized to provide only temporary storage for one unit of copy being processed, whereas the copy memory 50 provides storage for all units of copy (and versions thereof) which have been processed by the FIG. 1 system since the time that the entire system was last cleared. (Of course, device 50 must be cleared occasionally in order to avoid having its storage capacity exceeded). The purpose in having the quasi-permanent storage of device 50 supplemented by the temporary storage of the device 45 is that, in the processing of units of copy in cycles after the first, the device 50 transmits stored information to computer 30 and, in that instance, the device 45 provides a storage site in lieu of device 50 for the portion so far processed of the copy then being processed, and therefore, avoids the necessity (which would otherwise arise) of simultaneously transmitting data from device 50 to computer 30 and from computer 30 to device 50.

With regard to the operations which have been listed hereinbefore as #5 and #6, as the computer processes a unit of copy, it electrically drives either an on-line high speed printer 55 (by way of a data transfer connection 56) or an on-line high speed tape punch 60 (by way of a data transfer connection 61). Both devices have speeds of operation sufficient to keep up with the processing by computer 30. The printer 55 is, for example, an RCA high speed printer (model #333) or an IBM high speed printer (model #1443). The punch 60 is, for example, an RCA punch designated as model #332 or the Teletype punch which is designated as model BRPE-18.

The choice as to which of devices 55 and 60 will be driven is made in any processing cycle by an instruction code keyboarded by the typist at the beginning of that cycle as a part of the input copy. During the first and every other cycle except the last, the device which is usually chosen to be driven is the printer 55. That printer is controlled by the central processing unit 30 through the connection 61 to provide a printed output copy of the input copy as revised by the processing of the computer.

During the first cycle the printed output copy differs from the input copy in that the index number assigned by the computer to that unit of copy appears in the "index group" which is in red ribbon in the unnumbered heading line at the top of the copy. Further, the random length text lines of the input copy have been grouped into justifiable lines (or at least approximately justifiable lines), and line number have been provided for such lines, the line numbers appearing in red ribbon on the left hand margin of the output copy. All of the red ribbon instruction codes which formed parts for the input copy remain in red ribbon in the printed output copy except for codes which call for, say, "indent for paragraph" and in respect to which the instructions have been executed during the printing-out of the copy.

As indicated by line 65, after the printing of the "first" output copy (i.e., the copy derived from the first printing cycle), that copy is editorially revised at a location represented by block 70 by one or more persons who are specialists in such matters (e.g., editors, writers, researchers, copy readers, proof readers, copy fitters). The first revision of a copy is usually by an editor. After editorial revision, the first printed output copy is submitted for rekeyboarding to the typist operator of one of the input perforator machines as, say, the perforator 10*a*. The rekeyboarding by that operator initiates the second copy processing cycle for that unit of copy.

During the second cycle, the keyboarding commences with the typing out in red ribbon and in the unnumbered heading line (at the top of the copy) of the "index group" as revised to include the index number assigned during the previous cycle to the first processed version of such unit of copy. Thereafter, the keyboarding continues on through the numbered lines (including instruction codes) of the body of the editorially revised first output copy. That keyboarding is, as before, without regard to line length (i.e., without justification by the typist) and without numbering on the left hand margin of the lines produced in the course of keyboarding the new input copy.

Any line of the first output copy which has been editorially revised is keyboarded in full for the new input copy. Those lines, however, of the output copy which have not been changed are not keyboarded. Instead, the typist replaces those unrevised lines by keyboarding (as instruction codes) those line numbers which were assigned those "saved" lines during the first cycle, and which appear among those printed in red ribbon at the left hand margin of the output copy. In so keyboarding the "saved" line numbers, the typist by appropriately associating them may (as later explained) provide an individual indication of each of one or more saved lines or, alternatively, provide a collective indication of a whole block or unbroken sequence of saved lines. Thus, the typist is relieved of the burden of rekeyboarding those lines of the output copy which have not been editorially revised (and which may comprise most of the lines of such copy). Moreover, the possibility of generating new typographical errors during rekeyboarding is wholly eliminated insofar as the unrevised lines are concerned.

The keyboarding of the editorially revised first output copy serves to convert it into a "second" input copy, i.e., the input copy provided for the second processing cycle. That second input copy is transmitted in the same way as was the first input copy to the central processing unit 30. Within the unit 30, the second input copy is first subjected (under the control of the stored computer program) to a merging operating (operation #7) which is in addition to the six copy processing operations, previously mentioned. The merging operation takes place as follows.

It will be recalled that the keyboarding of the second input copy included the keyboarding of the index number assigned that unit of copy during the first cycle, and, moreover, the keyboarding of the instruction codes representing the numbers (assigned during the first cycle) of the lines or blocks of lines which are "saved" because those particular lines were not revised in the course of editorially revising the first output copy. The combination of that index number and of a given one of those line number instruction codes serves to provide the address of the corresponding saved lines or block of lines which have been stored in the copy memory 50 since the first processing cycle. In response to the detected presence of such a code combination, the computer 30 calls out from storage in device 50 the coding corresponding to the desired saved line or block of lines. Within the computer 30, the various called-out sub-strings of codings are merged or "spliced" with the sub-strings of codings received at the input 33 of the computer and representing the keyboarded, editorially revised lines of the first output copy. By this merging of the revised and unrevised portions of the output copy, there is provided in the computer 30 a composite string of codings which accurately represents that copy as a whole, but of which only a part of the sub-strings have been supplied by the second cycle keyboarding, the remaining sub-strings being supplied as sub-strings stored over in the copy memory from the first processing cycle.

After the mentioned composite string of codings has been formed, the computer 30 performs in connection with that string the same six operations which were carried out during the first cycle as if the subject matter processed during the second cycle were an entirely new unit of copy rather than being, as it is, a second version of a previously processed unit of copy. That is, the computer assigns to the second version an index number different from that assigned to the unit of copy during the first cycle. Further, the computer operates de novo to brake the random length lines of the second version into lines which are justifiable, and to renumber (if necessary) the lines of the second version which result from the breaking procedure. In the course of so processing the second version, the justifiable lines are, as before, stored line by line (concurrently with the processing) in assembly memory 45 and, at the end of processing of the version, are transferred to the copy memory 50 to be stored therein. The second cycle is completed by the printing out by the printer 55 of a "second" output copy which incorporates the editorial revision made between the first and second cycles in the unit of copy under consideration.

The second output copy is editorially revised at location 70 and is then submitted for keyboarding to the typist operator at one of the input perforators 10*a*–10*c* to thereby initiate a third processing cycle, and so on. The keyboarding and other operations of the third cycle are similar to the already described keyboarding and other operations of the second cycle. The recycling of the progressively perfected versions of the unit of copy may continue through one, two, or several more cycles. The third cycle and each additional cycle is like the second in that the typist operator keyboards only revised lines, the codings corresponding to those revised lines are merged in computer 30 with codings of called-up unrevised lines which have been stored in copy memory 50 since the previous cycle, a new index number is assigned to the version of the unit of copy which is currently being processed, and that version is newly broken into justifiable lines and is newly line numbered in respect to the lines so obtained.

The last cycle at its end is different from the preceding cycles in that the last output record is not printed out. Instead, during the last cycle the computer 30 controls punch 60 by way of connection 61 to punch out a coded output record on a tape 75 of which the coding is compatible with the intended use of the tape. For example, if the output record is to be composed on a conventional tape-controlled "Linotype" machine which internally computes the individual widths needed to be assigned to the characters and word spaces in a line in order to effect justification thereof, then the coding which is used on the tape is ordinary six level TTS (Teletypesetter) code. If, on the other hand, the output record is to be composed on, say, a Model 540 Photocomposer manufactured by the Photon Corporation, then, because the last-named composer effects justification in response to supplied width information rather than by internal computation, the coding on the tape 75 includes codings representing for each line to be composed the individual widths which should be assigned to characters and word spaces in that line in order to give proper justification. In such latter instance, the width information which is coded on tape 75 is provided by an operation of computer 30 which is in the nature of a justification computation.

As indicated by FIG. 1, the tape 75 may be utilized at a local composing site to, say, control the operation of a local composing machine. Alternatively, the tape 75 may be fed to a tape-actuated transmitter (not shown) linked by radio or wire to a remote receiver which punches out a duplicate tape for use in composing operations conducted at the remote site.

*Copy processing of a specific example*

Figure 2:
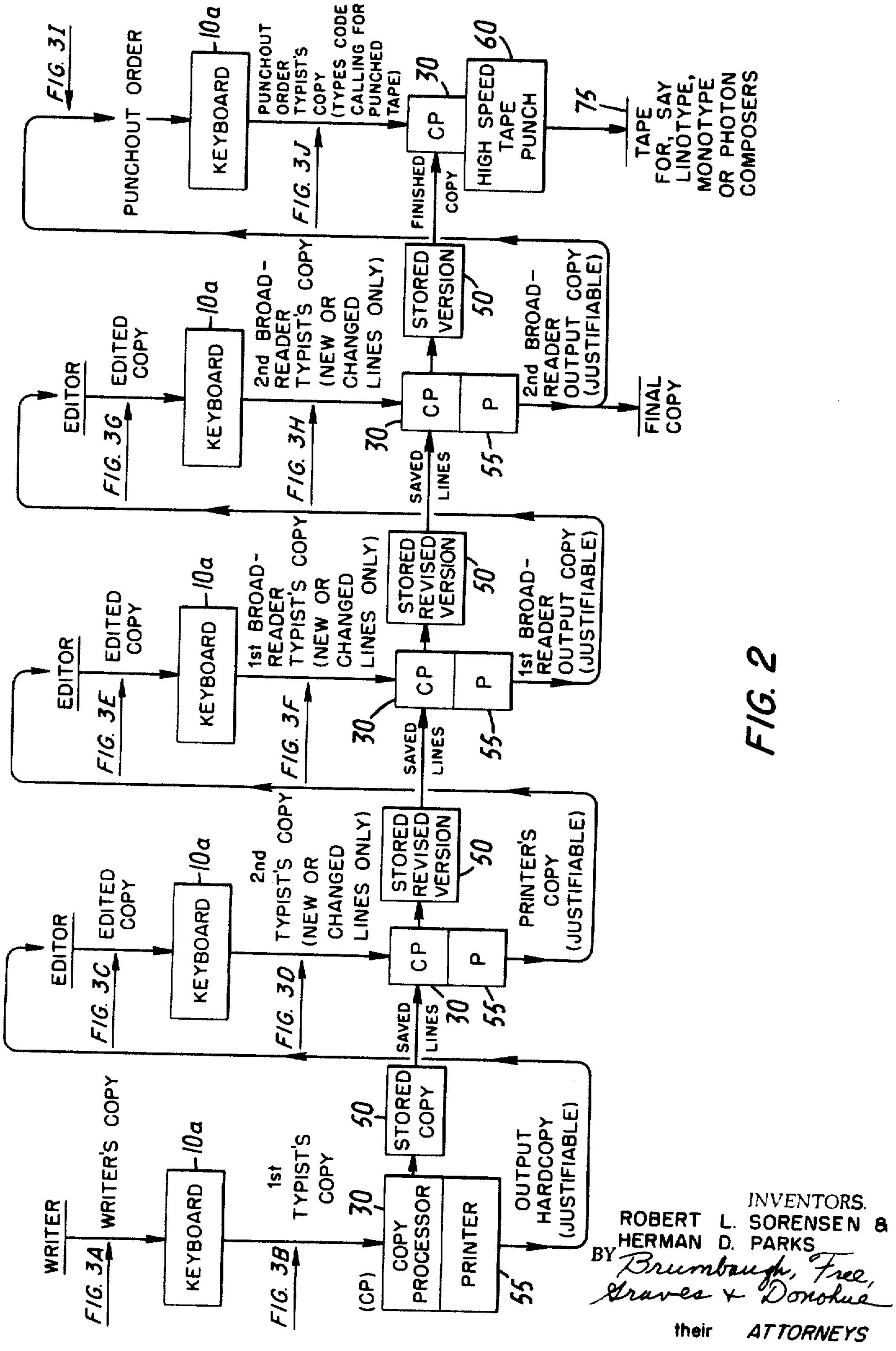
FIG. 2 is a schematic flow diagram of the progress of an exemplary unit of copy through the FIG. 1 system during successive copy processing cycles.

A more complete understanding of the FIG. 1 system is gained from a consideration of FIGS. 2 and 3A–3J. FIGURE 2 shows by way of a flow diagram the recycling through a number of transcription cycles of an exemplary unit of copy. FIGS. 3A–3J show the various forms assumed by such unit of copy in the course of such recyclings. The unit of copy which is used as an example is assumed as being a unit of copy produced, processed and editorially revised as part of the publishing operations of Time, Inc., the assignee hereof. In the copy representations of FIGS. 3A–3J any symbol which is underlined appears in the actual copy without underlining but in red ribbon. Also, the slash marks in FIGS. 3C and 3E appear in red ribbon in the actual corresponding copy.

Referring now specifically to the last-mentioned figures, a writer has written his story on an ordinary typewriter to produce a "writer's copy" (FIG. 3A). That copy is then sent in (FIG. 2) via the Copy Desk for a first typing.

FIG. 3B shows the "typist's first copy" as it would appear on the platen of the input tape perforator after the typist has finished keyboarding (FIG. 2). As mentioned before, that "typist's first copy" (FIG. 3B) has, in practice, no other function than to provide immediate visual feedback to the typist. For the purposes of this description, however, it shows some of the procedure which the typist follows in order to provide the computer 30 with proper instructions for processing the copy.

The typist starts each story by keyboarding a "heading" or "instruction" line. In the instruction line of FIG. 3B, the first seven symbols TA00000 form the heretofore mentioned "index group," the meaning of those symbols being discussed in the text of the reproduced story. The use of all zeros for the last five symbols of the index group is a "flag" which informs the computer that this is the first time that this story is being processed, and that both a story number (to replace the first two zeros) and an index number (to replace the next three zeros) should be assigned by the computer. The story number which will be assigned is the next available one for the given department (here, The Nation) and, once assigned, remains constant through all subsequent processing cycles of that particular story. The index number which will be assigned is the next one available in the computer regardless of the source of copy, and that index number will be different for each processed version of a particular story.

It might be noted that in the index group the T in the first symbol position indicates that the story is for the publication "Time," and that the A in the second symbol position indicates that the story is for "The Nation" department of "Time."

The three shown pairs of letters which follow the "index group" are the "composition group" which instruct the computer 30 as to the type faces, AA, the line measure BA and the format of the story CA which are to characterize the printed output copy produced in that cycle by the FIG. 1 system. In the instance considered, the code CA calls for standard format hardcopy to be produced by the printer 55. What is meant herein by "standard format hardcopy" is a typed copy wherein the lines are triple spaced (to make editorial revision easier), and wherein each typed line is made up of two printed column lines.

The first heading or "instruction" line is followed by a second "heading" line which contains miscellaneous information such as an express indication of the magazine department for which the story was prepared, the name of the writer, the date of typing, the typist's initials, etc. Below the second heading line the story has a primary head "TECHNOLOGY" and a secondary head "Here Come The Robots." In the copy of FIG. 3B the instruction codes DA and DB have been keyboarded in directly before the primary head and secondary head, respectively, to indicate that their desired format is that of No. 1 head and No. 2 head, respectively. If no changes are made in those heads in future typings and copy were to be set by, say, the mentioned Model 540 photocomposer, those code symbols would be sufficient to punch into the tape of the photocomposer the extra codes required to set those heads along with the body of the story.

The four uppermost lines of the FIG. 3B copy are short unjustifiable lines which do not belong to the text of the copy. Those four short lines are recognized by the computer 30 as being ones for each of which the carriage return on the output printer 55 has the same position in the sequence of printing operations as does the carriage return in the sequence of operations by which that line is keyboarded. Such recognition may be provided by special instruction codes (not shown) produced for only those four lines when the typist strikes her "carriage return key." Alternatively, recognition may be programmed in the sense that, say, the index group in the instruction line provides to the computer 30 a secondary instruction that the line in which that group appears and the next three following lines are each to be terminated (during printing out) by a carriage return apart from any consideration of whether or not the line is justifiable.

FIG. 3B shows that the typist has started the body of the story with the code symbols EA to indicate "Paragraph" and has done so again later to start a new paragraph as called for by the writer. Finally, at the completion of the copy, the typist has used the "end" code symbols EB to indicate that she has finished typing the story. Thereafter, the codings on tape **11*a* which represent the typed copy are, as described, processed by the computer 30, and a first output version of the unit of copy is printed out by the printer 55** (FIG 2).

FIG. 3C represents the first output version after it has been revised by an editor (FIG. 2) and is ready for keyboarding. Ignoring the editor's marks, the FIG. 3C copy shows some of the changes effected in the unit of copy as a result of its initial cycle of processing. First, in the third and fourth symbol positions of the index group, "00" has been replaced by the story number "04" which indicates that the story considered is the fourth story worked upon in the same computer run for the same magazine department (The Nation). Moreover, the computer has further operated to assign to the first processed version of the story the index number "306" which appears in the fifth to seventh symbol positions of the index group.

Below the instruction line, every line has been numbered. Odd numbers only are used for the format of FIG. 3C because each line of typescript represents two printed one-column lines. A slash mark (in red ribbon in the actual copy) appears in the approximate center of typewritten line to show the division between the two printed lines which it represents. Thus, the printed line (typed half line) following the mark is an even numbered line.

No hyphenation has been used to break lines. Instead, in computing for justification purposes, the central processing unit 30 has determined the first space nearest the point at which the line would be broken if it were set in type. In most cases, this space would be the line break point, but, where hyphenation would be required in type setting, the nearest space which would produce the least error is selected. To prevent accumulative error, an allowance for this adjustment is carried into the computation for the next line break. The advantage of such compromise mode of justification is that it does not call for the more elaborate and slower methods of determining hyphenation which are used in later ones of the copy processing cycles.

One other feature of the first output version is shown in FIGURE 3C at the conclusion of the body of the story. That feature is that a line count has been computed by the unit 30 and has been printed out (in this case 24 lines).

The FIG. 3C version is, as editorially revised, keyboarded (FIG. 2) by the typist to provide a "second typist's copy" and, also, the input to the FIG. 1 system for the second copy processing cycle. The "second typist's copy" is represented by FIG. 3D, and that copy shows the results of the typist's keyboarding as it appears on the platen of her machine. As illustrated, the typist has keyboarded the instruction line ("index group") exactly as it appears on the edited copy which she is working from, and, thus, the computer 30 will known where to look for any saved lines which the typist may later call for. The first of those saved lines is the No. 1 head including its identification, DA, as such, and the typist has called for this by keyboarding 003 which is the line number assigned that head during the first cycle. As shown, the editor has called for a two line No. 2 head to replace the original one line No. 2 head.

The first two lines of the body of the edited copy contain no changes, and so the typist has called them out by number. The convention for such calling out is that, when two line numbers are typed in sequence without any space between them, the computer 30 understands this to means that those numbers designate the first and last lines in an unbroken sequence or "block" of lines of which the entire block is to be called out from the copy memory 50. On the other hand, where a line number stands alone or is in a sequence with other line numbers but is separated from the others by a space, the computer 30 is signaled that only numbers actually typed out represent lines to be saved. Thus, 001003 means the three lines from 001 to 003, inclusive, are to be saved, whereas 001 003 means "save these two lines while omitting 002 from the new copy."

Further features of the FIG. 3D version are as follows. The editor has asked that the words "Copy Processing System" be set in italics, and the typist has indicated that such is to be done by inserting the instruction code FB before those words. Then, because the following text is to be set in Roman, the typist has so indicated by the insertion of the instruction code FA before that text.

Upon the keyboarding of the FIG. 3D version, it is processed (FIG. 2) by the central processing unit 30 and is then printed out by printer 55 to provide what is known as a "printer's copy." The printer's copy is subjected to revision by an editor to result in the edited copy which is represented by FIG. 3E. As is apparent, the FIG. 3E copy (disregarding the edit marks thereon) is very similar in format to FIG. 3C, the editorially revised output hardcopy from the first processing cycle. Note from FIG. 3E that the computer 30 has again assigned a new index number to this latest version of the story, and has gone again through the line-breaking computation and assigned line numbers de novo to the printed-out lines.

According to the customary practice in the publishing art, such a "printer's copy" would be the final output copy prior to the actual composing operation. In the present method, however, the printer's copy is recycled by being returned (FIG. 2) to an input typist.

In keyboarding the received copy of FIG. 3E, the typist makes the change indicated by the editor for the instruction line. To wit, in that line the instruction code CB is substituted for the previous instruction code CA. The effect of that substitution is to change the format of the next output copy to that of the "broadreader" form suitable for use in a dummy. Another effect of the substitution is that the semi-justification procedure used in the earlier copy processing cycles is replaced in the next cycle by the exact procedure in which end-of-line hyphens are used as needed, and the insertion of such hyphens is effected by the action of the person observing and operating the hyphenation display unit 40 (FIG. 1).

The keyboarding (FIG. 2) of the FIG. 3E version results in the "first broadreader typist's copy" which is shown in FIG. 3F. With the exception of the above-mentioned change in the instruction line, the typist in keyboarding to produce the FIG. 3F version has used the same procedure as that previously described in connection with FIG. 3D. The keyboarded version shown in FIG. 3F is processed by computer 30 (FIG. 2), and the processed material is then printed out and is subsequently revised by an editor to provide the edited "first broadreader output copy" which is represented by FIG. 3G. As indicated in that figure, again a new index number has been automatically assigned to this latest version of story TA04, the format is now "broadreader" format in that it is one column line wide without spacing, and numbers are assigned consecutively to each line. The dummy room has asked that line 026 be "greened" for purposes of fit, and the editor has done so (the correction shown at line 026 would, in the actual copy, be in green pencil). An additional correction has been picked up in line 021.

The FIG. 3G broadreader is keyboarded as indicated by FIG. 3H to provide the computer input for the fourth cycle and to result in the "second broadreader typist's copy" which is illustrated in the last-named figure. The FIG. 3H version of the unit of copy is illustrative of the saving of labor which can result from being able to call out blocks of saved lines.

The FIG. 3H version after being processed in unit 30 (FIG. 2) and subsequently printed out by device 55 results in a "second broadreader output copy." Since no further copy fitting or proofreading changes are called for, that copy is the final printed output copy. As described, however, the desired end product for the succession of copy processing cycles is a final output copy in the form of punched codings in the type 75. To obtain this end product, the "second broadreader output copy" from high speed printer 55 is given a punch-out order (FIG. 2). As a result, the copy is marked up in the manner shown in FIG. 3I. That is, the copy is designated as being for "tape," a galley number is assigned, and, in the instruction line, the previous code CB has been replaced by the instruction code CC which calls for punch-out.

To effect punch-out, the typist keyboards the "broadreader" of FIG. 3I to initiate the last cycle of operation and, incidentally, to produce the "punch-out order typist copy" which is shown in FIG. 3J. In general, the keyboarding procedure for the final cycle is similar to the procedure in earlier cycles, and its character will be self-evident from FIG. 3J. During the last cycle, the copy processing unit 30 controls (FIG. 2) the high speed punch 60 to produce a punched tape version of the copy shown in FIG. 3I. However, the codes which, in practice, appear in red in the FIG. 3I "boadreader" are omitted and are replaced in the punched tape version by codes suitable to the use of the tape. For example, hot metal tape will reproduce on a Teleprinter the words "Copy Processing System" (line 006 and 007) in red ribbon which is the convention for italics. Other adjustments are made accordingly. On the other hand, if the tape is to be used in a photocomposer of the type manufactured by the Photon Corporation, the code FB would be replaced by the appropriate disc level code to set italics.

The above described method being exemplary only, it is to be understood that additions thereto, omissions therefrom and modifications thereof can be made without departing from the spirit of the invention, and that the invention comprehends methods differing in form and/or detail from that which has been specifically described. For example, if, during a cycle in which line breaking is by exact justification, the computer 30 encounters a line which cannot in any grammatically acceptable way be rendered justifiable by end-of-line hyphenation, the computer can be programmed to indicate that the line as it now stands is wholly unjustifiable and requires "greening," and the computer can be further programmed to indicate by special codings what number of standard charter character or word space units of width must be added to said line in order to render it (1) tightly justifiable, (2) loosely justifiable.

Accordingly, the invention is not to be considered as limited save as is consonant with the recitals of the following claims.

In the claims:

1. A processing system for a unit of copy comprising, keyboard-actuated transcribed means to convert the text of said copy when keyboarded into a first string of coding, program-controlled data processing means responsive to said string to assign an index number to said string and to subdivide said string into substrings of coding and to assign line numbers to those substrings, printer means controlled by said processing means to produce a printed uncoded output copy bearing said index number and the lines of text and line numbers corresponding to said substrings, and data storage means coupled to said processing means to store said substrings in memory, said storage means being responsive to said index number and to selected line numbers when subsequently keyboarded on said transcriber means and transmitted as codings to said processing means to selectively call out from memory and supply to said processing means the ones of said substrings corresponding to those selected line numbers, said called-out substrings representing saved lines of text of said output copy as revised, and said processing means being responsive to said called-out substrings and to substrings derived from a keyboarding in full on said transcriber means of each changed line of text of said output copy as revised to merge such two sets of substrings so as to provide for control of said printer means a second string of codings representative of the full text of a revised version of said output copy.

2. A system as in claim 1 further comprising output code-changing means coupled to said processing means in parallel with said printer means, said processing means being controlled by an instruction code transmitted thereto from said transcriber means to select for operation one or the other of said printer means and code-changing means, and said code-changing means when so selected being controlled by a string of coding from said processing means to convert the information represented by said string of coding into a different code and to produce in said different code a permanent record of said information.

3. A system as in claim 2 in which said code-changing means is coupled to a composing machine controlled by such means to produce a composed version of said output copy.

4. A system as in claim 1 further comprising additional data storage means coupled to said processing means for temporarily storing in memory during processing of a string of codings the substrings derived therefrom, said additional means being adapted upon completion of said processing to transfer said temporarily stored substrings to said first-named data storage means.

5. A system as in claim 1 further comprising substring length-selector means coupled to said processing means to control the division by such means of a string of coding into substrings so as to render justifiable the lines of text corresponding to those substrings.

6. A processing system for a unit of copy comprising, input means providing a string of codings representative of run-together lines of text of a unit of input copy, program-controlled data processing means coupled to said input means to receive said string and to subdivide said string into substrings of coding corresponding to separate lines of text, and justification range computing and substring length selector means responsive to the codings in said string to compute therefrom the size and position of ranges of codings in said string corresponding to justification ranges for lines of text derived from said string, said last-named means further providing for selective control of said subdividing action as a function of said coding ranges and of the character of the coding-represented text included in those ranges so as to render justifiable the lines of text corresponding to those substrings.

7. A system as in claim 6 in which said substring length-selector means includes means to transcribe coding in said string into corresponding alphanumeric characters of the text of the copy and to visually display said characters together with an indication of a subsequence of characters within which the sequence of said characters may be broken to provide a justifiable line of text, and manually operated means to select a break point between two adjacent characters in said subsequence and to signal said processing means to subdivide said string of coding at a corresponding point into substrings of coding.

8. A processing system as in claim 6 further comprising short term data storage means coupled to said processing means and operable during said subdividing of said string into substrings to provide temporary storage for said substrings as they are formed, said short term data storage means being further operable after the processing of said string has been completed to call out said temporarily stored substrings from memory so as to clear itself from said substrings and to render such substrings available for utilization by further means.

9. A processing system as in claim 8 further comprising printer means responsive to the substrings called out from memory by said short term data storage means to produce a printed output copy on which said substrings are converted into corresponding separate lines of justifiable alphanumeric text.

10. A system as in claim 8 further comprising long term data storage means coupled to receive the substrings called out from memory by said short term means and to store said susbtrings in memory for subsequent use by said processing means.

11. A processing system for a unit of copy comprising, keyboard actuated transcriber means to convert the lines of text of said copy when keyboarded into a first string of coding representative of said lines of text as run together, program-controlled data processing means responsive to said string to assign to said string an index number and to subdivide said string into substrings of coding representative of new lines of text and to assign line numbers to said substrings, justification range computing and substring length-selector means responsive to the coding in said string to compute therefrom the size and position of ranges of codings in said string corresponding to justification ranges for lines of text derived from said string, said last-named means further providing for selective control of said subdividing action as a function of said coding ranges and of the coding-represented text included in those ranges so as to render said substrings representative of new lines of text which are justifiable, short term data storage means coupled to said processing means and operable during the processing of said string to provide temporary storage for said substrings and operable after said processing has been completed to clear itself by reading out such substrings from memory, printer means controlled by said substrings to produce a printed output copy bearing said index number and the new lines of text and the line numbers corresponding to those substrings, and long term data storage means coupled to receive the substrings supplied out of memory by said short term storage means and to store said substrings in memory at addresses identified by said index number and the line numbers corresponding to those substrings, said long term storage means being responsive to said index number and to selected line numbers when subsequently keyboarded on said transcriber means and transmitted as codings to said processing means to selectively call out from memory and supply to said processing means the ones of said subtrings corresponding to those selected line numbers, said called-out substrings representing saved lines of text of said output copy as revised, and said processing means being responsive to said called-out substrings and to substrings derived from a keyboarding in full on said transcriber means of each changed line of text of said output copy as revised to merge such two sets of substrings so as to provide for control of said printer means a second string of codings representative of the full text of a revised version of said output copy.

12. A processing system for copy comprising, data processing means adapted to process successive versions in coded form of a unit of said copy during successive cycles of operation of said processing means, printer means driven by said processing means during each cycle except the last to produce a printed output copy of the code version being processed in that cycle, and code-changing output means driven by said processing means during the last of said cycles to convert into a different code the information of the coded version being processed in that last cycle and to produce a permanent record in said different code of said information.

13. A processing system for a unit of copy comprising, input means operable over first and later transcription cycles for said copy to convert text thereof into a string of coding during said first cycle and revised portions of said text into coding during said later cycle, program controlled data processing means coupled to said input means to receive said coding therefrom, said processing means being operable during said first cycle to process the string of text-derived coding from said input means and operable during said later cycle to merge revised text coding from said input means with saved text coding from another source so as to form a string of coding and to process the latter string of coding, short term data storage means coupled to said processing means and operable during each of said cycles to receive from said processing means and temporarily store in memory the string of coding processed in that cycle, said short term means being further operable after completion of the processing in each such cycle to call out from memory the string of processed coding stored in that cycle to thereby clear itself, and long term data storage means coupled to receive said called-out string of coding and to store such coding in memory, said long term means being coupled to said processing means to provide therefor said source of saved text coding and being operable on command to supply saved text coding to said processing means for merger as described with revised text coding supplied from said input means.

References Cited

UNITED STATES PATENTS

| | | | |
|---|---|---|---|
| 3,245,045 | 4/1966 | Randlev ---------- | 340—172.5 |
| 3,248,705 | 4/1966 | Dammann et al. ---- | 340—172.5 |

ROBERT C. BAILEY, *Primary Examiner.*

M. LISS, G. D. SHAW, *Assistant Examiners.*